(12) United States Patent
Holthaus et al.

(10) Patent No.: US 9,429,082 B2
(45) Date of Patent: Aug. 30, 2016

(54) METHOD AND SYSTEM FOR OPERATING AN INTERNAL COMBUSTION ENGINE WITH MULTIPLE TORQUE CURVES

(75) Inventors: Brian Eugene Holthaus, Waterloo, IA (US); Dick J. Goering, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 2182 days.

(21) Appl. No.: 11/491,675

(22) Filed: Jul. 24, 2006

(65) Prior Publication Data

US 2008/0046155 A1 Feb. 21, 2008

(51) Int. Cl.
| F02D 28/00 | (2006.01) |
| F02D 21/08 | (2006.01) |
| F02D 23/00 | (2006.01) |
| F02D 41/14 | (2006.01) |
| F02D 41/24 | (2006.01) |

(52) U.S. Cl.
CPC ............ *F02D 21/08* (2013.01); *F02D 23/005* (2013.01); *F02D 41/1497* (2013.01); *F02D 41/2422* (2013.01); *F02D 2250/18* (2013.01); *F02D 2250/26* (2013.01); *Y02T 10/144* (2013.01)

(58) Field of Classification Search
CPC ............... F02D 21/08; F02D 41/2422; F02D 41/1497; F02D 23/005; F02D 2250/18; F02D 2250/26; Y02T 10/144

USPC ............ 701/51, 54, 99, 101, 102, 103, 104, 701/106, 108, 115; 477/20, 43, 100; 173/176, 180; 123/406.23
See application file for complete search history.

(56) References Cited

U.S. PATENT DOCUMENTS

| 5,224,457 A | 7/1993 | Arsenault et al. ............ 123/526 |
| 5,595,551 A * | 1/1997 | Hedstrom et al. ............ 477/109 |
| 6,000,376 A * | 12/1999 | Hess et al. .................... 123/333 |
| 6,144,913 A * | 11/2000 | Braun et al. .................. 701/102 |
| 6,285,933 B1* | 9/2001 | Kohler et al. .................. 701/34 |
| 2005/0027413 A1* | 2/2005 | Kuroda et al. .................. 701/22 |
| 2005/0171670 A1* | 8/2005 | Yoshioka et al. .............. 701/54 |

OTHER PUBLICATIONS

Grootjans, XNA 2.0 Game Programming Recipes, 2008, Apress, p. 408.*
AJ Linear Interpolation Equation Formula Calculator, Accessed: Jan. 17, 2006, http://www.ajdesigner.com/phpinterpolation/linear_interpolation_equation.php.*

* cited by examiner

*Primary Examiner* — Spencer Patton
(74) *Attorney, Agent, or Firm* — Ingrassia, Fisher & Lorenz, P.C.

(57) ABSTRACT

A method of operating an internal combustion engine includes the steps of: determining an upper torque curve at which exhaust emissions from the internal combustion engine are acceptable; determining a lower torque curve at which exhaust emissions from the internal combustion engine are acceptable; and operating the internal combustion engine using a command torque curve ranging between the lower torque curve as a lower limit and the upper torque curve as an upper limit.

15 Claims, 8 Drawing Sheets

METHOD AND SYSTEM FOR OPERATING AN INTERNAL COMBUSTION ENGINE WITH MULTIPLE TORQUE CURVES

FIELD OF THE INVENTION

The present invention relates to internal combustion engines, and, more particularly, to a method and system for operating an internal combustion engine using a defined torque curve.

BACKGROUND OF THE INVENTION

Internal combustion (IC) engines may be incorporated into on-road vehicles for road applications or off-road vehicles for non-road applications. IC engines used in non-road applications are making increased use of electronics to meet emissions standards imposed by governmental regulations (e.g., Environmental Protection Agency (EPA)). The increased cost and complexity of advanced electrical systems to meet emissions requirements is offset by increased operational features available with the electronics. For example, increased use of electronics allows the use of alternative discrete torque curves and/or governor curves that are used under certain machine conditions. Non-road machines are capital goods and few, if any, customers would purchase a new machine if the only added "feature" of it's higher cost are lower emissions.

For a given IC engine, it is common to use a predefined torque curve with torque (load) as a function of engine speed. The torque curve used in operation defines the maximum output torque at a given engine speed. The torque or load is the rotational effort of the crankshaft of the engine, i.e., the output power. The engine speed is typically determined by the position of the throttle, either electronic or mechanical. For the corresponding engine torque, the engine controller controls operation of one or more engine control parameters to achieve the desired output torque. For example, the engine controller can control an exhaust gas recirculation (EGR) variable in an EGR system (such as a diluent-to-air ratio), a controllable element in a variable geometry turbocharger (VGT), a fuel injection timing, and/or a fuel pressure.

For a given IC engine, the engine is certified for emissions using the one or more discrete torque curves assigned to that engine. The emissions certification is expensive and must be done for each torque curve; thus, the number of torque curves assigned to an engine are kept to a bare minimum.

What is needed in the art is a method and system for potentially using a large number of torque curves for an IC engine, without having to recertify the emissions for the engine for each separate torque curve.

SUMMARY OF THE INVENTION

The invention comprises, in one form thereof, a method of operating an internal combustion engine, including the steps of: determining a value of an independent variable associated with at least one high power (HP) engine control parameter and at least one low power (LP) engine control parameter; determining the at least one HP engine control parameter associated with an upper torque curve, dependent upon the independent variable; determining the at least one LP engine control parameter associated with a lower torque curve, dependent upon the independent variable; and interpolating at least one target engine control parameter lying between the HP engine control parameter and the LP engine control parameter.

The invention comprises, in another form thereof, a method of operating an internal combustion engine, including the steps of: outputting a torque curve value from a work vehicle controller to an engine controller, the torque curve value dependent upon at least one vehicle control parameter; and determining at least a portion of a command torque curve ranging between a lower torque curve as a lower limit and an upper torque curve as an upper limit, the engine controller outputting at least one engine control parameter associated with the command torque curve.

The invention comprises, in yet another form thereof, a method of operating an internal combustion engine, including the steps of: determining an upper torque curve at which exhaust emissions from the internal combustion engine are acceptable; determining a lower torque curve at which exhaust emissions from the internal combustion engine are acceptable; and operating the internal combustion engine using a command torque curve ranging between the lower torque curve as a lower limit and the upper torque curve as an upper limit.

The invention comprises, in still another form thereof, a control system for operation of an internal combustion engine, including a work vehicle controller outputting a torque curve value dependent upon at least one vehicle control parameter. An engine controller receives the torque curve value and determines at least a portion of a command torque curve ranging between a lower torque curve as a lower limit and an upper torque curve as an upper limit. The engine controller outputs at least one engine control parameter associated with the command torque curve.

DETAILED DESCRIPTION OF THE INVENTION

Figure 1:
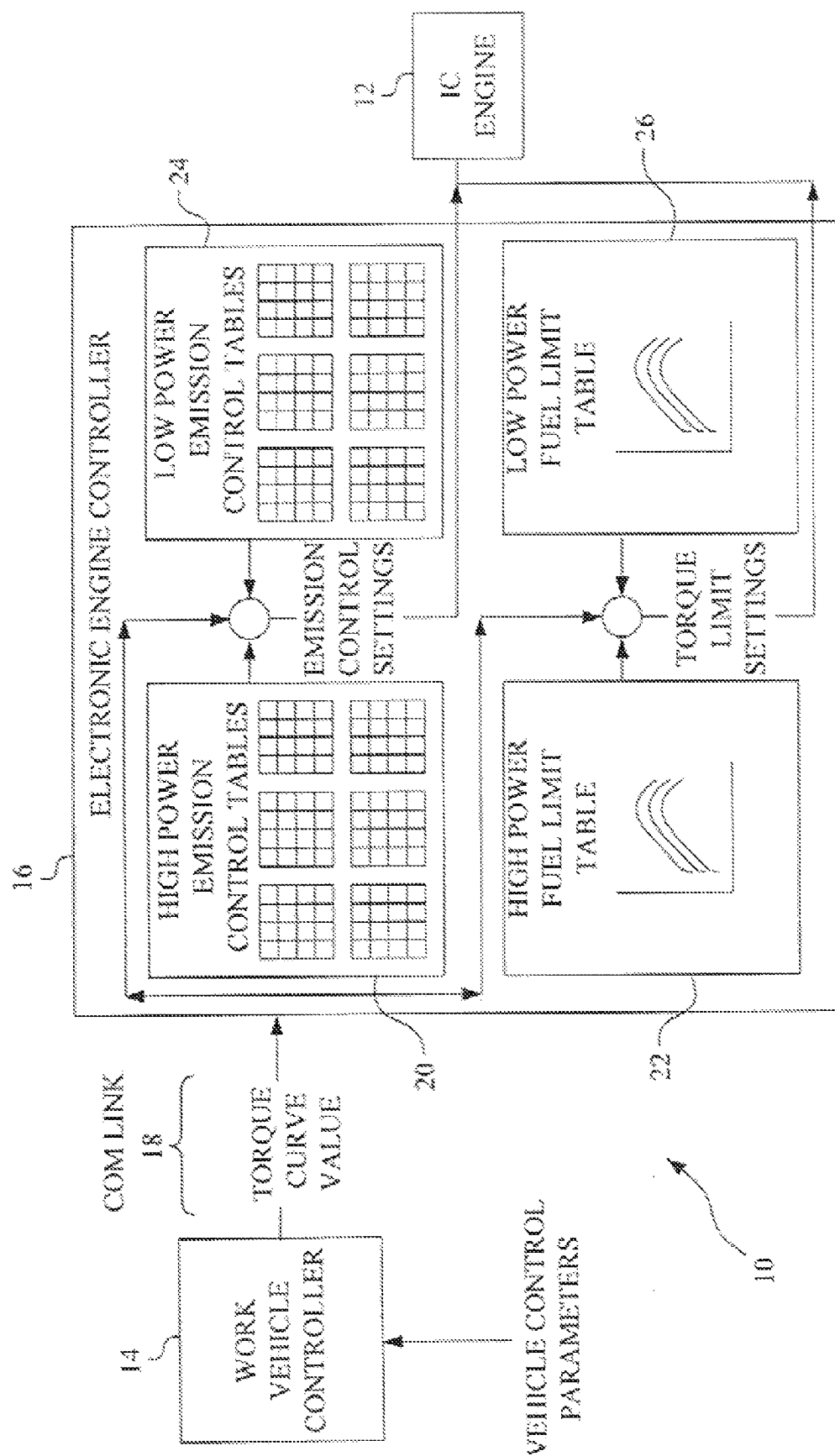
FIG. 1 is a schematic view of a system of the present invention for operating an internal combustion engine with multiple torque curves.

Referring now to the drawings, and more particularly to FIG. 1, there is shown a schematic view of an embodiment of a system 10 of the present invention for operating an IC engine 12. System 10 is part of a non-road work vehicle (not labeled), such as an agricultural tractor, combine, construction equipment, etc. IC engine 12 is configured as a diesel engine, but could also possibly be configured as a spark ignition engine. IC engine 12 is sized appropriately for the non-road vehicle.

Work vehicle controller 14 is located onboard the non-road vehicle and controls various electronically controllable functions of the vehicle. For example, in the event the non-road vehicle is configured as a combine, work vehicle controller 14 could control float functions of the cutting platform attached to the feeder housing at the front end of the combine, actuation of an unloading auger, etc.

Work vehicle controller 14 also receives various input signals corresponding to vehicle control parameters providing an indication of the current state of the non-road vehicle. For example, the vehicle control parameters may include ground speed, engine speed, a transmission gear and/or an accessory demand. The engine speed is typically determined by the position of the throttle which is actuated by an operator. Although typically configured as a hand lever, the throttle provides an electrical signal to work vehicle controller 14 indicative of the current engine speed. The accessory demand generally corresponds to a load which is applied to the non-road vehicle. For example, the accessory demand may be a power take-off load, a hydraulic load and/or a draw bar load.

Work vehicle controller 14 is in communication with engine controller 16 via communication link 18. Communication link 18 typically is in the form of a data bus or other electrical connection; however, can also be in the form of a wireless link depending upon the application. Work vehicle controller 14 transmits output signals to engine controller 16, including one or more torque curve values used in establishing a command torque curve, as will be described in more detail hereinafter.

Engine controller 16 includes one or more memories which store one or more engine control parameters used in operation of IC engine 12. Engine controller 16 is shown as being separate from IC engine 12, but may be an integral part of the electronics of IC engine 12. In the embodiment shown, the engine control parameters for operation of IC engine 12 include a number of HP engine control parameters and a number of LP engine control parameters. More particularly, the HP engine control parameters include a plurality of HP emission control tables 20 and an HP fuel limit table 22. Similarly, the LP engine control parameters include a number of LP emission control tables 24 and LP fuel limit table 26. Each separate table in the HP emission control tables 20 and LP emission control tables 24 corresponds to a different engine control parameter at discrete points along an upper torque curve, to be described hereinafter. For example, one emission control table can correspond to an EGR variable in an EGR system (such as a diluent-to-air ratio), another table can correspond to a vane position of a VGT, another table can correspond to a fuel injection timing, and yet another table can correspond to a fuel pressure (e.g., a high pressure common rail system). The discrete values within each table correspond to the values of the HP engine control parameters, such as described above, at the discrete points along the upper torque curve. Similarly, the HP fuel limit table 22 and the LP fuel limit table 26 each contain values corresponding to a fuel limit setting of IC engine 12 along an upper torque curve and lower torque curve, respectively.

Figure 2:
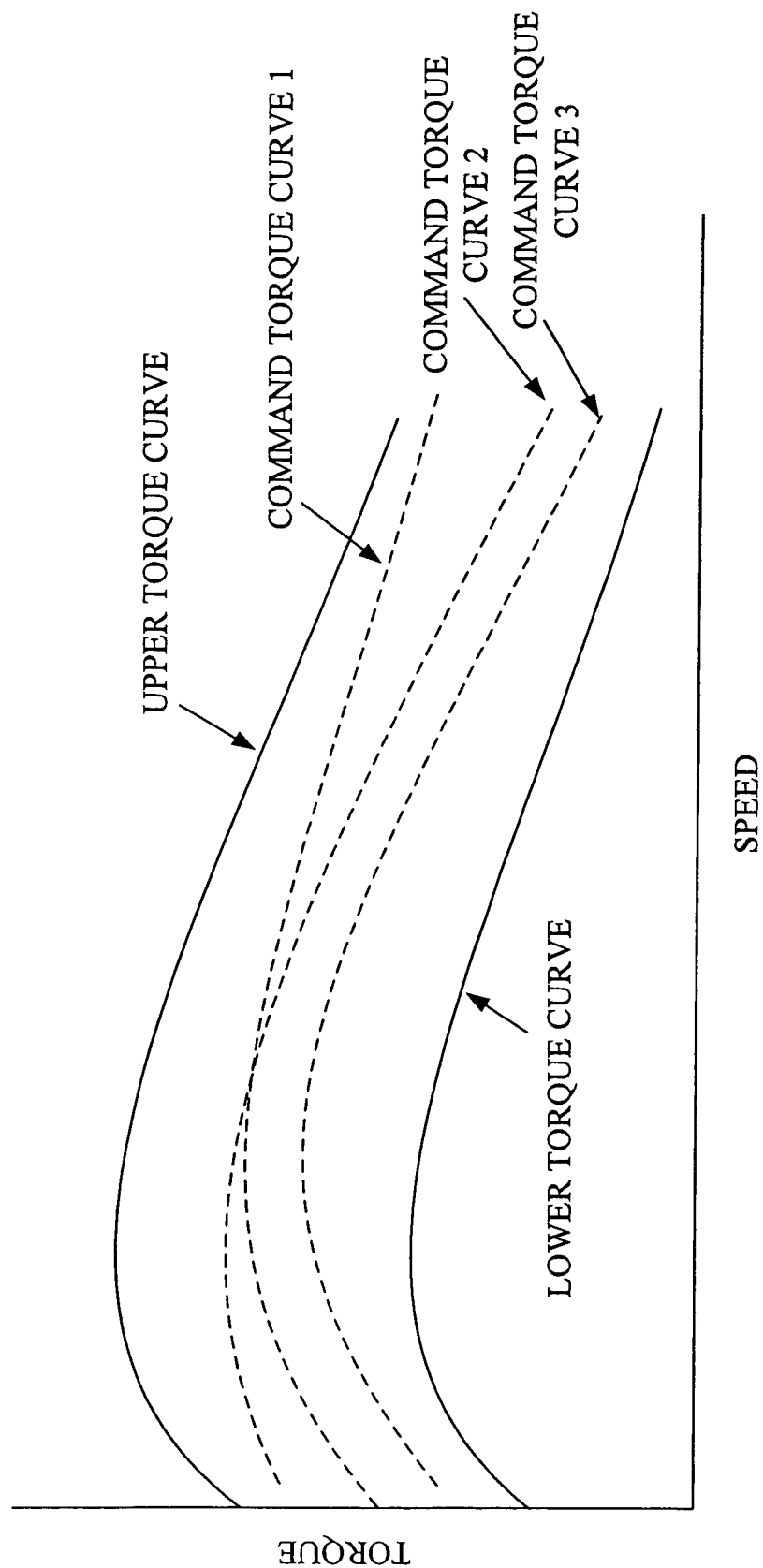
FIG. 2 is a graphical illustration for a particular engine of an upper torque curve, lower torque curve, and a number of intervening command torque curves.

Referring now to FIG. 2, the upper torque curve and the lower torque curve are discrete torque curves at which the exhaust emissions from IC engine 12 are acceptable within requirements set forth by EPA regulations. Exhaust emissions from IC engine 12 are certified at both the upper torque curve and the lower torque curve using applicable governmental testing, such as the so-called 8-Mode standards, maximum allowable emission limits (MAEL), not-to-exceed (NTE) requirements, and other steady state and/or transient emissions requirements. Engine controller 16 operates IC engine 12 using a selected command torque curve with the upper torque curve as an upper limit, the lower torque curve as a lower limit, or one of almost an infinite number of command torque curves of various shapes therebetween. Since the command torque curves can range up to and including the upper torque curve and lower torque curve, the emissions from IC engine 12 along any command torque curve also fall within acceptable emissions limits for IC engine 12. Since the shape of any command torque curve is known lying between the upper torque curve and lower torque curve, the particular torque value of the command torque curve along the ordinate axis (i.e., speed) can be interpolated between the upper torque curve and lower torque curve.

Figure 3:
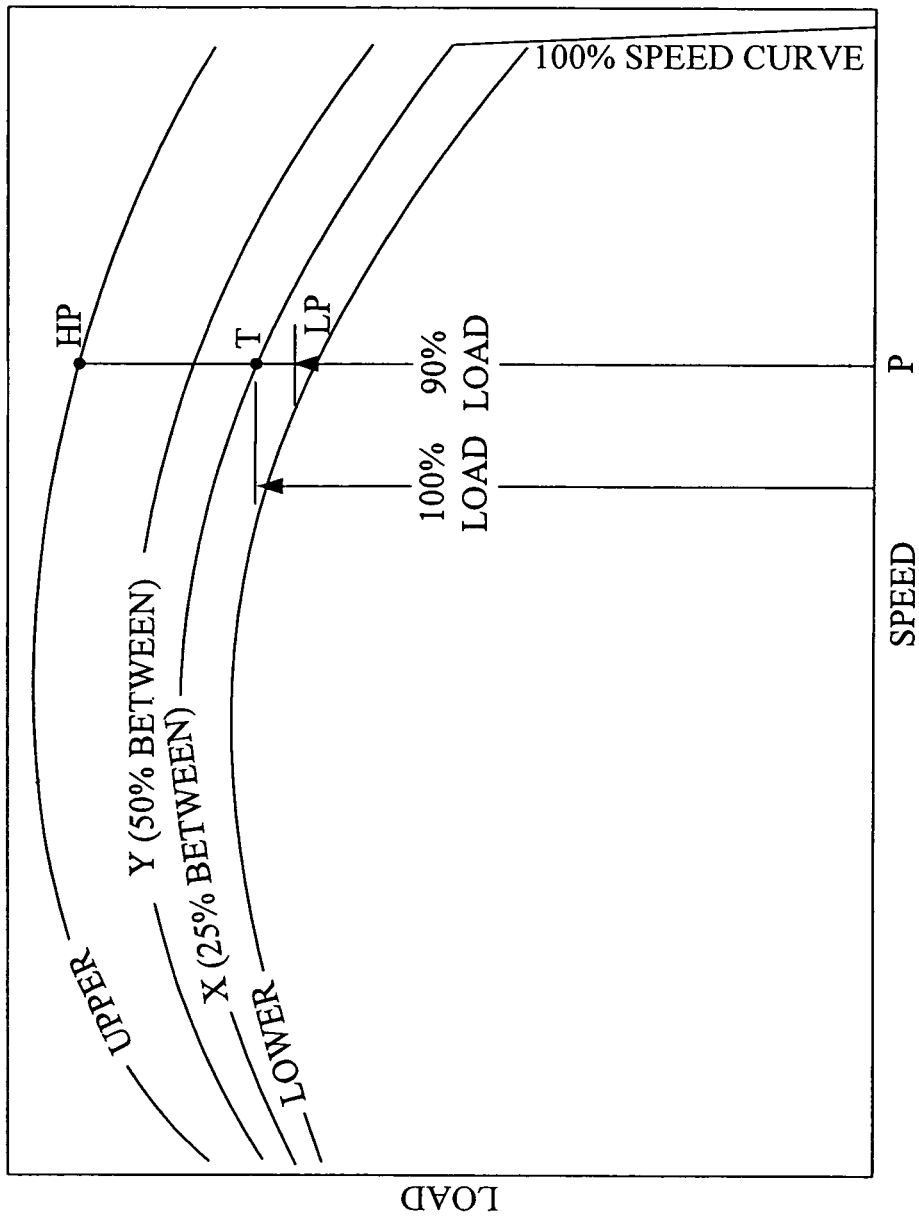
FIG. 3 is a graphical illustration of a number of intervening command torque curves at specified percentage distances between the upper torque curve and lower torque curve.
Figure 4:
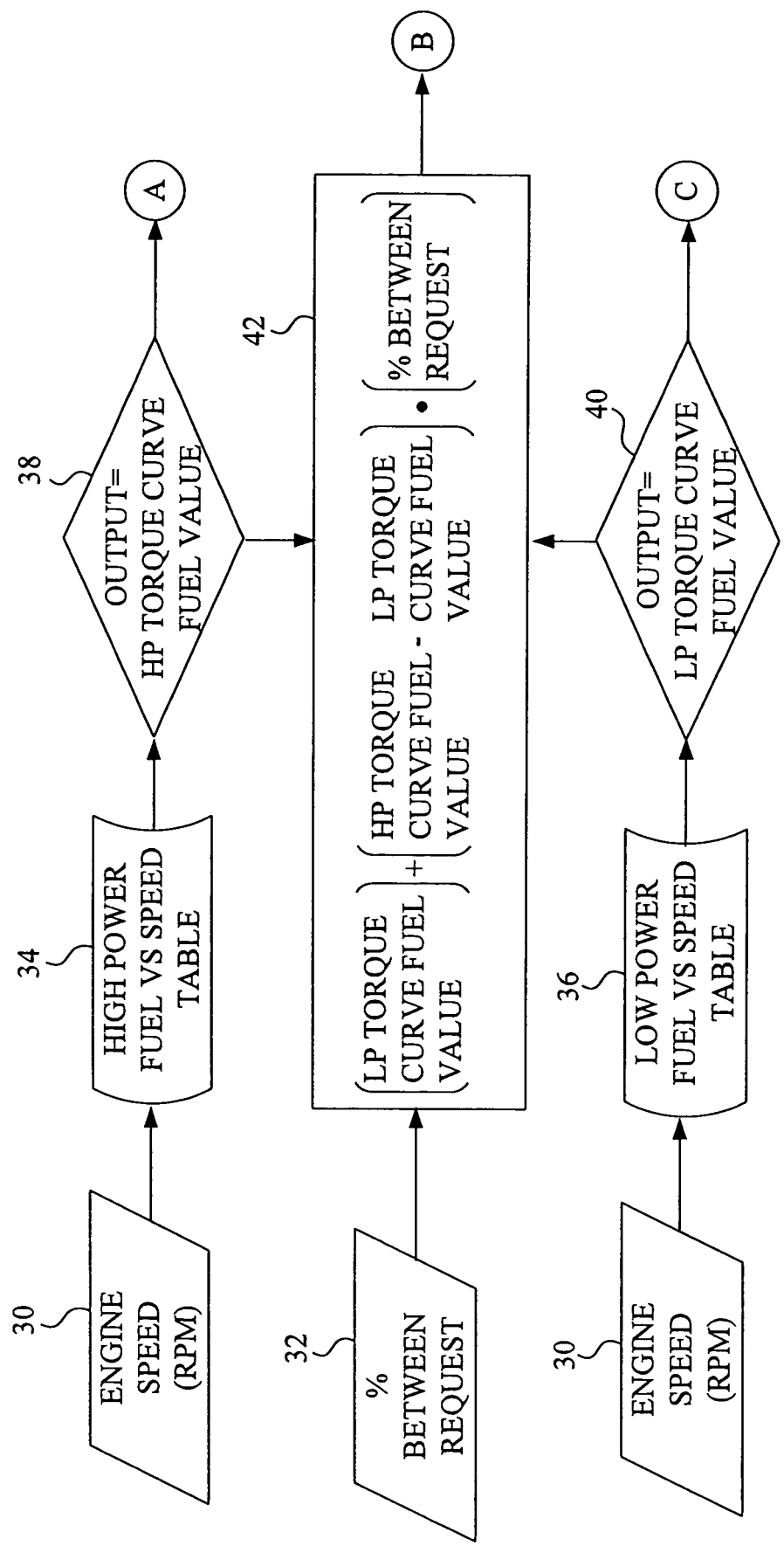
FIGS. 4-8 illustrate a flowchart for an embodiment of the method of the present invention for operating an internal combustion engine with multiple torque curves.
Figure 5:
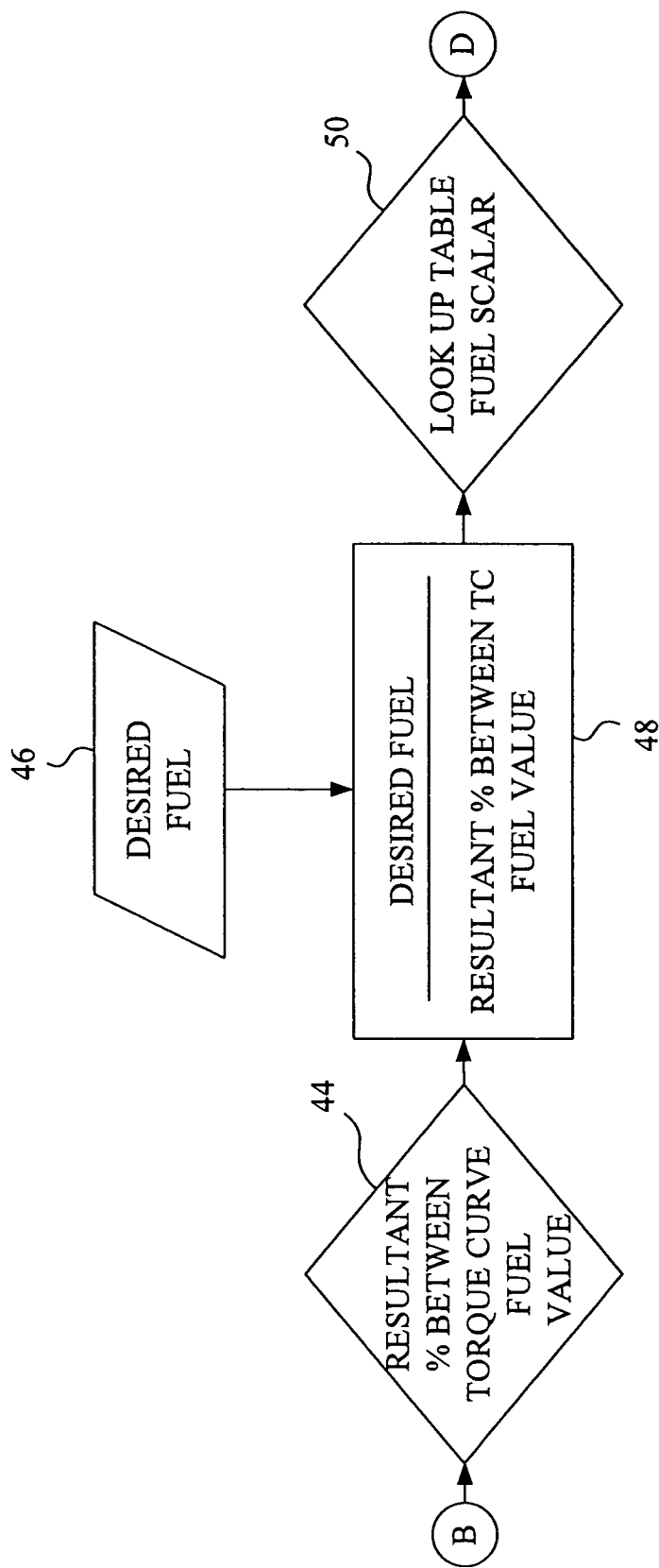
Figure 6:
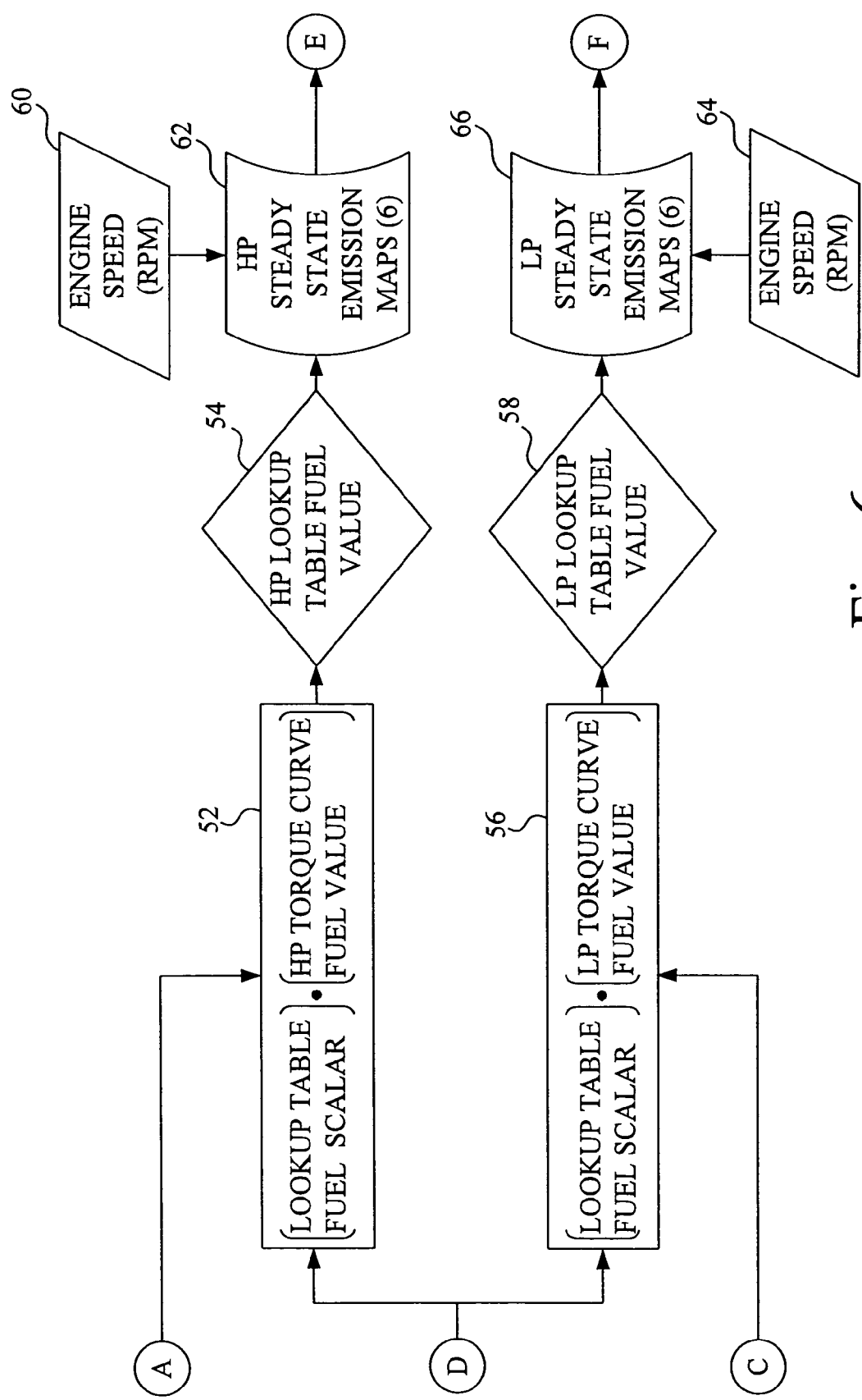
Figure 7:
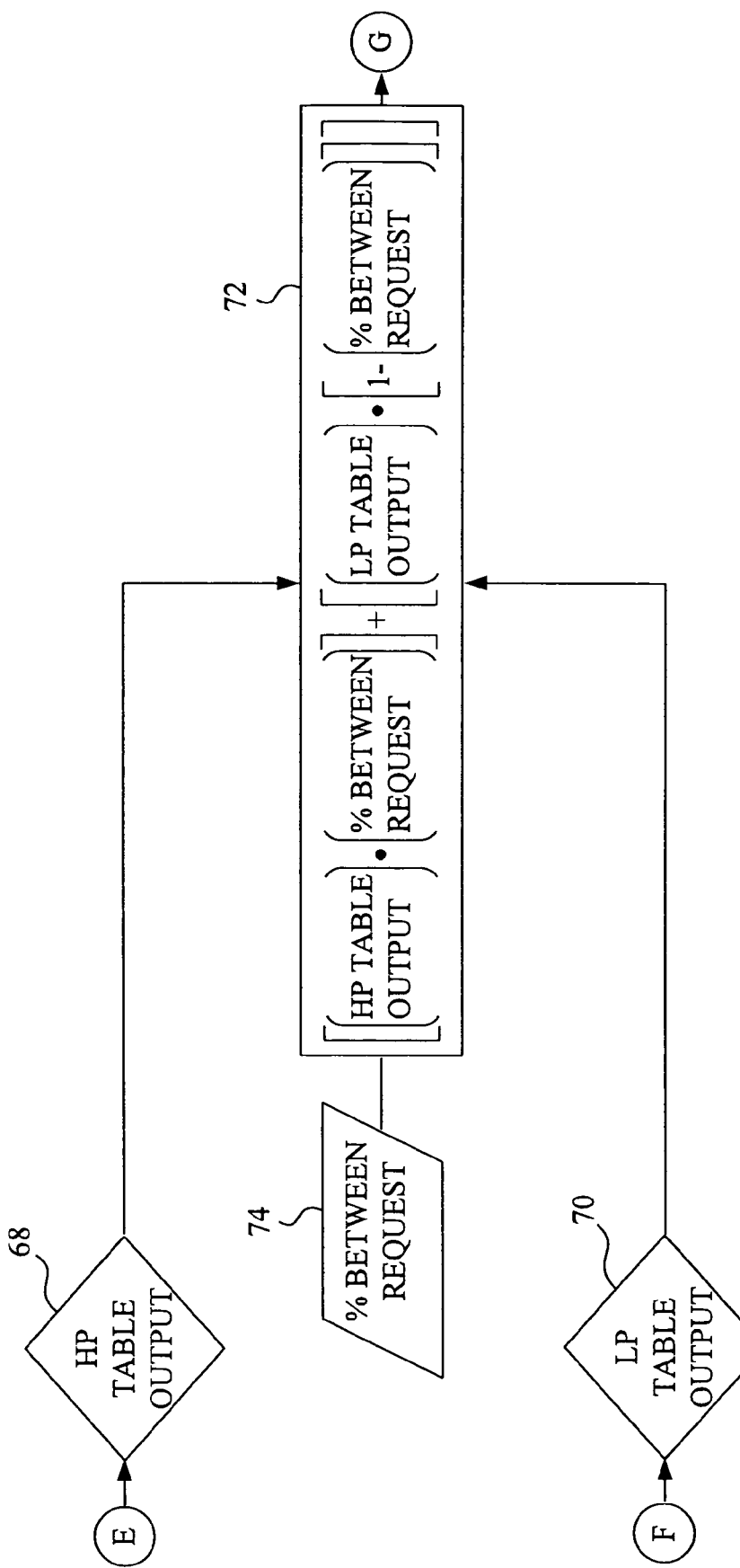
Figure 8:
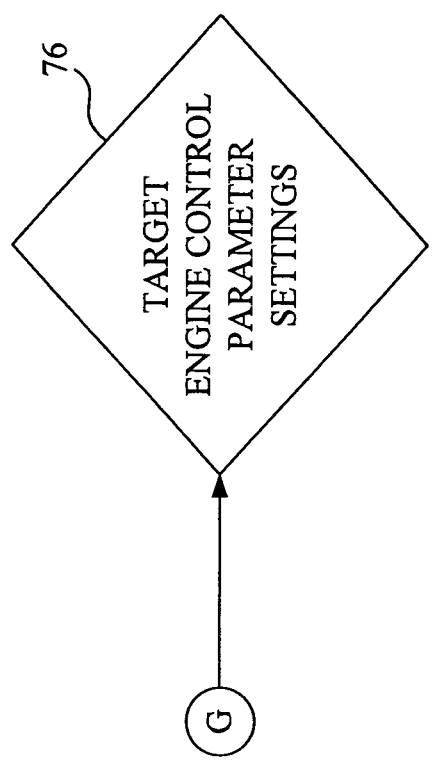

Referring now to FIG. 3, a method of interpolating a target engine control parameter at a specific point along a command torque curve X will be described in greater detail. At a specific point P along the ordinate or speed axis, the HP torque value along the upper torque curve and the LP torque value along the lower torque curve can be determined. For the HP torque value, the corresponding value of a target engine control parameter defined within one of the tables in HP emission control tables 20 can be determined. Similarly, for the LP torque value, the value of a desired target engine control parameter within one of the tables in LP emission control tables 24 can be determined. For command torque curve X shown in FIG. 3, the torque curve value outputted from work vehicle controller 14 to engine controller 16 is assumed to be 25% (i.e., 0.25). Thus, command torque curve X lies 25% of the distance from lower torque curve toward the upper torque curve at any point P along the speed axis. Using linear interpolation, the distance between the torque values LP and T is 25% of the distance between the torque values LP and HP. Using conventional linear interpolation techniques, the value of the target engine control parameter for torque value T can also be calculated using the values of the target engine control parameter at torque values LP and HP.

As another example, assuming a torque curve value of 50% (i.e., 0.50), a command torque curve Y results which is 50% of the distance between upper torque curve and the lower torque curve at any point P along the speed axis. For a desired target engine control parameter such as one contained within emission control tables 20, 24 or fuel limit tables 22, 26, the values of the target engine control parameter at the upper torque curve and the lower torque curve can be determined in the lookup table, and the corresponding target engine control parameter along command torque curve Y can be interpolated.

Although the command torque curves X and Y in FIG. 3 are shown as being at a fixed proportional distance between the upper torque curve and lower torque curve at any point P along the speed axis, it is also apparent by comparison with FIG. 2 that the command torque curve need not necessarily lie at a fixed proportional distance between the upper torque curve and lower torque curve. For example, command torque curves 1, 2 or 3 (FIG. 2) are at a variable proportional distance between the upper torque curve and lower torque curve which is directly dependent upon the torque curve value outputted from work vehicle controller 14 and dynamically varies dependent upon a determined current speed of the non-road vehicle. That is, the currently determined ground speed results in a change in the torque curve value (also referred to as a "percent between request" in one embodiment hereinafter), which in turn results in a change in the interpolated value of the torque. However, the particular shape of the command torque curve must be known so that the correct interpolation technique can be used to find the value of the target engine control parameter at any point P along the speed axis. Likewise, it is not necessary to use a linear interpolation algorithm to determine the value of the target engine control parameter along the command torque curve at a point P. The main idea is that lookup tables are used for an engine control parameter at any point P along the upper torque curve and lower torque curve. The values of the engine control parameter at the upper torque curve and lower torque curve are then used to determine the value at the same point P along the command torque curve.

It will also be appreciated that for storage capacity considerations within a memory, it may be impractical to store the values of the engine control parameters at discrete points P along the speed axis. If the value of a target engine control parameter is desired at a point P which lies between adjacent, discrete points at which the values of the engine control parameter are stored for the upper torque curve and lower torque curve, then it is also possible to interpolate along the speed axis to obtain the exact values of the engine control parameter at both the upper torque curve and lower torque curve. The interpolation along the vertical or load (torque) axis then can be carried out as described above.

Additionally, it will also be appreciated that rather than using lookup tables stored within a memory, it is also possible to compute the values of an engine control parameter at the upper torque curve and lower torque curve. This technique may require additional computing horse power, which may not always be available.

Referring now to FIGS. 4-8, a flow chart illustrating an embodiment of the method of the present invention for operating an internal combustion engine with multiple torque curves will be described. A vehicle control parameter (e.g., speed) is used as an input to work vehicle controller 14 (step 30). The engine speed can be determined by the position of the throttle within the work vehicle. This type of engine speed control is known as all speed governing; however, min-max governing is also possible in which diesel fuel delivery is primarily a function of the throttle position but the idle speed and maximum speed are governed by the engine controller. Work vehicle controller 14 determines and outputs a torque curve value in the form of a percent between request (step 32), along with the engine speed. The engine speed is used to access HP fuel limit table 22 (step 34) and also access the LP fuel limit table 26 (step 36). The corresponding maximum fuel values when using the upper torque curve as a maximum torque curve (HP torque curve fuel value) and when using the lower torque curve a maximum torque curve (LP torque curve fuel value) are determined from the lookup table in steps 38 and 40, respectively.

In the method of the present invention described above, the throttle position is used as a work vehicle parameter to determine an engine speed set point for IC engine 12. However, it is also possible to use the throttle position as a direct indicator for the percent between request (step 32).

Using the percent between request in step 32, a linear interpolation technique is used to determine the actual fuel value at the proportional distance between the upper torque curve and lower torque curve (step 42). The resultant percent between torque curve fuel value (step 44) represents the maximum fuel which is available for a selected command torque curve at a given engine speed. If the engine is operating at less than full load, then a lesser desired amount of fuel is used (step 46). The ratio of the desired fuel to the maximum available fuel for that command torque curve and engine speed (step 48) is then used to calculate a look up table fuel scalar (step 50).

The look up table fuel scalar is multiplied times the maximum fuel available at the upper torque curve (step 52) to determine a corresponding scaled HP look up table fuel value (step 54). Similarly, the look up table fuel scalar is multiplied times the maximum fuel available at the lower torque curve (step 56) to determine a corresponding scaled LP look up table fuel value (step 58).

The scaled fuel value using the upper torque curve from step 54 and the engine speed (step 60) are used to access one or more HP emission control tables (step 62), respectively corresponding to one or more engine control parameters. Similarly, the scaled fuel value using the lower torque curve from step 58 and the engine speed (step 64) are used to access one or more LP emission control tables (step 66), respectively corresponding to one or more engine control parameters. The HP table output (step 68) and the LP table output (step 70) are used in a linear interpolation (step 72), based upon the percent between request (step 74), to obtain values for one or more target engine control parameter settings (step 76) for controllable operation of IC engine 12. Thus, using the engine speed and percent between request, IC engine 12 can be operated using a selected torque curve ranging between and including the upper torque curve as an upper limit and the lower torque curve as a lower limit.

Having described the preferred embodiment, it will become apparent that various modifications can be made without departing from the scope of the invention as defined in the accompanying claims.

The invention claimed is:

1. A method of operating a diesel engine, comprising the steps of:
   outputting a torque curve value from a work vehicle controller to an engine controller, said torque curve value dependent upon at least one vehicle control parameter;
   determining with said engine controller at least a portion of a selected command torque curve dependent upon said torque curve value, said command torque curve having a predefined shape and ranging at a known distance between a low power lower torque curve as a lower limit and a high power upper torque curve as an upper limit;
   outputting from said engine controller at least one engine control parameter associated with said command torque curve; and
   operating said diesel engine using said at least one engine control parameter.

2. The method of operating a diesel engine of claim 1, wherein said at least one engine control parameter includes at least one of an exhaust gas recirculation (EGR) variable, a vane position of a variable geometry turbine (VGT), a fuel injection timing, and a fuel pressure.

3. The method of operating a diesel engine of claim 2, including the step of controlling said engine using said at least one engine control parameter.

4. The method of operating a diesel engine of claim 1, wherein said at least one vehicle control parameter includes at least one of ground speed, engine speed, a transmission gear, and an accessory demand.

5. The method of operating a diesel engine of claim 4, wherein when said at least one vehicle control parameter includes an accessory demand, said accessory demand includes at least one of a power take-off load, a hydraulic load, and a drawbar load.

6. The method of operating a diesel engine of claim 1, including the step of controlling a rate of change of the at least one engine control parameter.

7. The method of operating a diesel engine of claim 1, wherein said engine controller determines said command torque curve.

8. A control system for operation of a diesel engine, comprising:
- a work vehicle controller outputting a selected torque curve value dependent upon at least one vehicle control parameter; and
- an engine controller receiving said torque curve value and determining at least a portion of a command torque curve dependent upon said torque curve value, said command torque curve having a predefined shape and ranging at a known distance between a low power lower torque curve as a lower limit and a high power upper torque curve as an upper limit, said engine controller outputting at least one engine control parameter associated with said command torque curve, and said engine controller operating said diesel engine using said at least one engine control parameter.

9. The control system for operation of a diesel engine of claim 8, wherein said at least one engine control parameter includes at least one of an exhaust gas recirculation (EGR) variable, a vane position of a variable geometry turbine (VGT), an injection timing, and a rail pressure in a high pressure common rail (HPCR) injection system.

10. The control system for operation of a diesel engine of claim 8, wherein said engine controller includes at least one high power (HP) emission control table associated with said upper torque curve, at least one low power (LP) emission control table associated with said lower torque curve; at least one HP fuel limit table associated with said upper torque curve; and at least one LP fuel limit table associated with said lower torque curve, said engine controller using said torque curve value to interpolate between values in said at least one HP emission control table and said at least one LP emission control table, and said engine controller using said torque curve value to interpolate between values in said at least one HP fuel limit table and said at least one LP fuel limit table.

11. The control system for operation of a diesel engine of claim 8, wherein said torque curve value is a decimal value ranging between 0 and 1.

12. The control system for operation of a diesel engine of claim 11, wherein said command torque curve is interpolated between said lower torque curve and said upper torque curve using said decimal value of said torque curve value.

13. The control system for operation of a diesel engine of claim 11, wherein said command torque curve is linearly interpolated between said lower torque curve and said upper torque curve.

14. The control system for operation of a diesel engine of claim 8, wherein said vehicle control parameter includes at least one of ground speed, engine speed, a transmission gear, and an accessory demand.

15. The control system for operation of a diesel engine of claim 14 wherein when said at least one vehicle control parameter includes an accessory demand, said accessory demand load includes at least one of a power take-off load, a hydraulic load, and a drawbar load.

* * * * *